(12) United States Patent
Matsumoto

(10) Patent No.: US 6,288,008 B1
(45) Date of Patent: Sep. 11, 2001

(54) METALLIC CATALYST SUPPORT AND PRODUCTION METHOD THEREOF

(75) Inventor: Hisao Matsumoto, Amagasaki (JP)

(73) Assignee: Matsumoto Kokan Co., Ltd., Amagasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 07/908,172

(22) Filed: Jul. 2, 1992

(30) Foreign Application Priority Data

Jul. 4, 1991 (JP) .................................................. 3-191077

(51) Int. Cl.[7] ............................... B01J 35/04; B01J 32/00
(52) U.S. Cl. ............... 502/527.23; 502/439; 502/527.22; 428/593; 422/180
(58) Field of Search ..................................... 502/439, 527; 428/593; 422/180

(56) References Cited

U.S. PATENT DOCUMENTS

| | | | |
|---|---|---|---|
| 4,433,064 | * 2/1984 | Pignon | 502/527 X |
| 4,777,158 | * 10/1988 | Cyron | 502/527 X |
| 4,946,822 | * 8/1990 | Swars | 502/527 X |
| 5,102,743 | * 4/1992 | Maus et al. | 502/439 |
| 5,278,125 | * 1/1994 | Iida et al. | 502/127 |

* cited by examiner

Primary Examiner—Bekir L. Yildirim
(74) Attorney, Agent, or Firm—Armstrong, Westerman, Hattori, McLeland & Naughton LLP

(57) ABSTRACT

A metallic catalyst support of honeycomb construction easy to manufacture and having a large strength is obtained in the invention by bonding at least one predetermined part of an end face opening of a core unit in axial direction across the end face opening.

15 Claims, 9 Drawing Sheets

METALLIC CATALYST SUPPORT AND PRODUCTION METHOD THEREOF

BACKGROUND OF THE INVENTION

1. Field of the Invention

The present invention relates to a metallic catalyst support for use in supporting catalyst for combustion and, more particularly, to a metallic catalyst support composed of a heat resistant metal provided with characteristics as a catalyst support.

2. Description of the Prior Art

Hitherto, in one of the environmental pollution control measures for automobiles, it has been conventional to interpose a ternary catalytic converter (catalytic converter rhodium) in a middle part of an exhaust pipe to purify the exhaust gas.

A metallic support of honeycomb construction has been known as one of such catalyst supports used in the converter. This metallic catalyst support comprises a corrugated plate and a flat plate each formed of a foil of 0.05 mm in thickness of heat resistant metal of the composition 20Cr-5Al, the said corrugated plate and flat plate being combined to form a core unit of multi-layer honeycomb construction by rolling or laminating them together.

To maintain the shape and construction of the core unit the, joint portions between the corrugated plate and the flat plate have been conventionally joined by brazing, spot-welding or laser welding an open end face thereof.

In the brazing method used most popularly as one of the mentioned joining methods, however, there is a disadvantage that not only the solder itself is expensive but also cost of the necessary equipment is high due to requirements such as vacuum, and high temperatures of not lower than 1000° C. Further, the brazing method is not always efficient since it takes much labor and time, and all in all, it may be said that this brazing is the most expensive for manufacturing the core unit of honeycomb construction.

In the spot-welding or end face laser welding method, it becomes essential to apply a very precise weld to a plurality of portions of a foil of 0.05 mm in thickness with a pitch of 2 mm. Thus these welding methods have not only a disadvantage of poor working efficiency but also that of less welding reliability.

Moreover, since in any of the mentioned conventional methods where joining is partially carried out between one corrugated plate and another flat plate immediately adjacent to each other, if looking at the plurality of welded spots entirely, there arise disadvantages such that a center part of the core unit may appear like a bamboo shoot or some joined portions may be separated due to repetition of thermal deformation under high temperature. To overcome the above disadvantages, a joining method has been proposed in which retainer protrusions are disposed alternately at several points of the corrugated plate and flat plate rolled together, as disclosed in Japanese Laid-Open Patent Publications (unexamined) Nos. 25321/1979 and 236949/1989 and Japanese Laid-Open Utility Model Registration Publication (unexamined) No. 136735/1988.

In the joining method proposed in these publications, the corrugated plate and flat plate are not directly joined, but only an end part there-between is joined, or relative part is in contact with the retainer protrusions only. Accordingly, as a result of sharp heating to a high temperature, sharp cooling therefrom to a low temperature, and repetition of such sharp temperature changes, the relative retainer parts tend to loosen due to uneven expansion and shrinkage between the corrugated plate and flat plate moreover, the corrugated plate and the flat plate forming a core unit tend to be vibrated and rubbed against each other due to the exhaust gas passing through at high speed, thus resulting in getting out of the catalyst support and after all a decline in the catalytic performance.

A further attempt has been proposed in which principal part of a case or outer casing is provided with a stopper for preventing the core unit from getting out (Japanese Laid-Open Utility Model Registration Publication (unexamined) No. 78219/1989). However, any of these arrangements is not related to manufacturing and assembling of the core unit, but disclosed that a core unit is received in the outer casing provided with the mentioned stopper, and no technical advantage of overcoming the above problems is disclosed.

SUMMARY OF THE INVENTION

The present invention was made to solve the above-discussed problems pertinent to the known metallic catalyst support of this type and has an object of easily providing an improved metallic catalyst support assembly comprising a core unit of honeycomb construction formed by combining a corrugated plate with a flat plate, a corrugated plate with another corrugated plate, etc., each plate being made of a heat resistant metal to function as a catalyst support, and by rolling or laminating these plates to form a multi-layer core unit.

Another object of the invention is to provide a strong and stable joining method in the atmosphere without any expensive solder for vacuum brazing.

To accomplish the foregoing object, a metallic catalyst support in accordance with the present invention comprises a core unit of honeycomb construction formed by combining a corrugated plate with a flat plate, a corrugated plate with another corrugated plate, or either a corrugated plate or a flat plate with an exhaust passage member, each plate and member being made of a heat resistant metal, and by rolling or laminating them to form a multi-layer; characterized in that a predetermined part of an end face opening of said core unit being indented in axial direction across said end face opening and, in said indented part, the corrugated unit and flat plate of said core unit are joined securely to each other by welding, deposition, buildup welding, brazing, flame coating or any other suitable joining means.

Other objects, features and advantages of the present invention will become apparent in the course of the following description with reference to the accompanying drawings.

BRIEF DESCRIPTION OF THE DRAWINGS

In the drawings forming a part of the present application.

DESCRIPTION OF THE PREFERRED EMBODIMENTS

Several embodiments of the present invention are hereinafter described in detail.

[Example 1]

Figure 1:
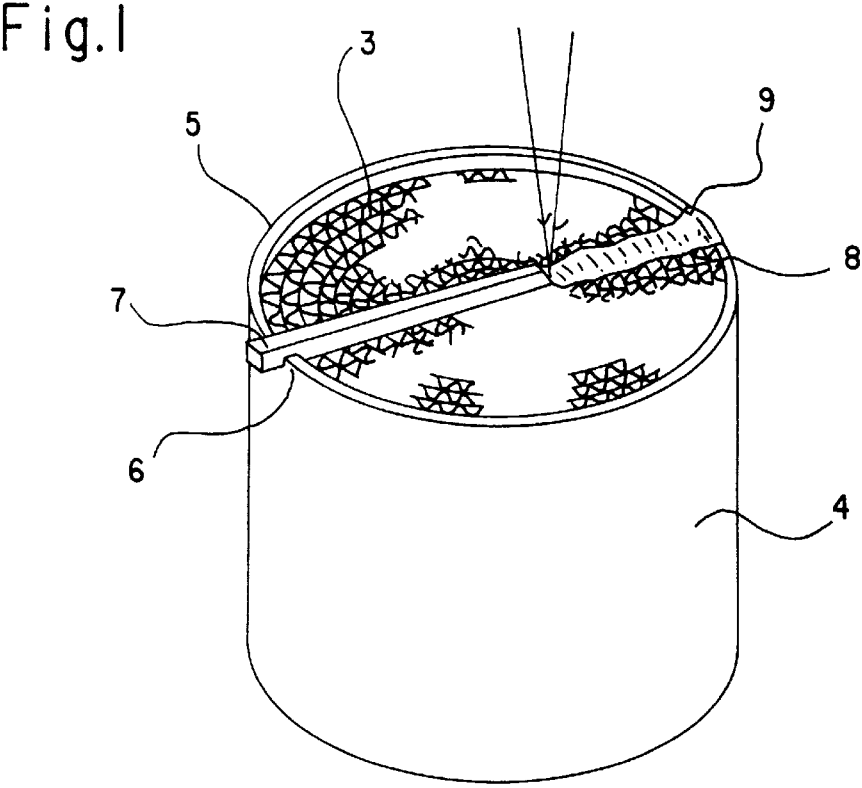
FIG. 1 is a schematic perspective view for explaining an example of the catalyst support in accordance with the present invention.

In the first example, a corrugated plate 1 and a flat plate 2, each composed of heat resistant metal foil of 20Cr-5Al of 0.05 mm in thickness and 100 mm in width, are combined each other and rolled together as shown in FIG. 1 to form a multi-layer, thus a honeycomb, core unit 3 of 80 mm in diameter (about 400 cells/inch square).

Then, this core unit 3 is received in an outer casing 4 made according to JIS4305-SUS430 (the abbrevation "JIS" meaning Japanese Industrial Standard herein) of 82.5 mm in external diameter and 1 mm in thickness in such a manner that the core unit 3 may be disposed lower than the end edge 5 of the outer casing 4 by 1 mm.

The outer casing 4 is provided with a notch 6 of 2 mm in width and 1 mm in depth at two sides thereof and a rod-like bonding member 7 of 2 mm×2 mm is engagedly inserted in the notch 6.

The rod-like bonding member 7 of 20Cr-5Al is held by the notch 6 of the outer casing 4 so as to be in contact with an end face opening 8 at a predetermined position of the core unit 3.

Then, the bonding material of member 7 is caused to become molten by heating with a $CO_2$ laser of 500 W in output and 200 mm/min. in speed under an argon atmosphere to obtain a molten bonding material 9, and the end face opening 8 of the core unit is bonded with such a molten bonding material 9. By this bonding treatment, the outer casing 4 is also solidly formed into one unit together as a result of such bonding of the notch 6.

In addition, the arrows in FIG. 1 indicate directions of laser irradiation.

In this Example 1, since the bonding material is simply placed on the end face opening of the core unit, the shape of the bonding material is not always required to be linear but any other shape such as three directional shape from the center, S-shape, etc. can be selected.

[Example 2]

Figure 2:
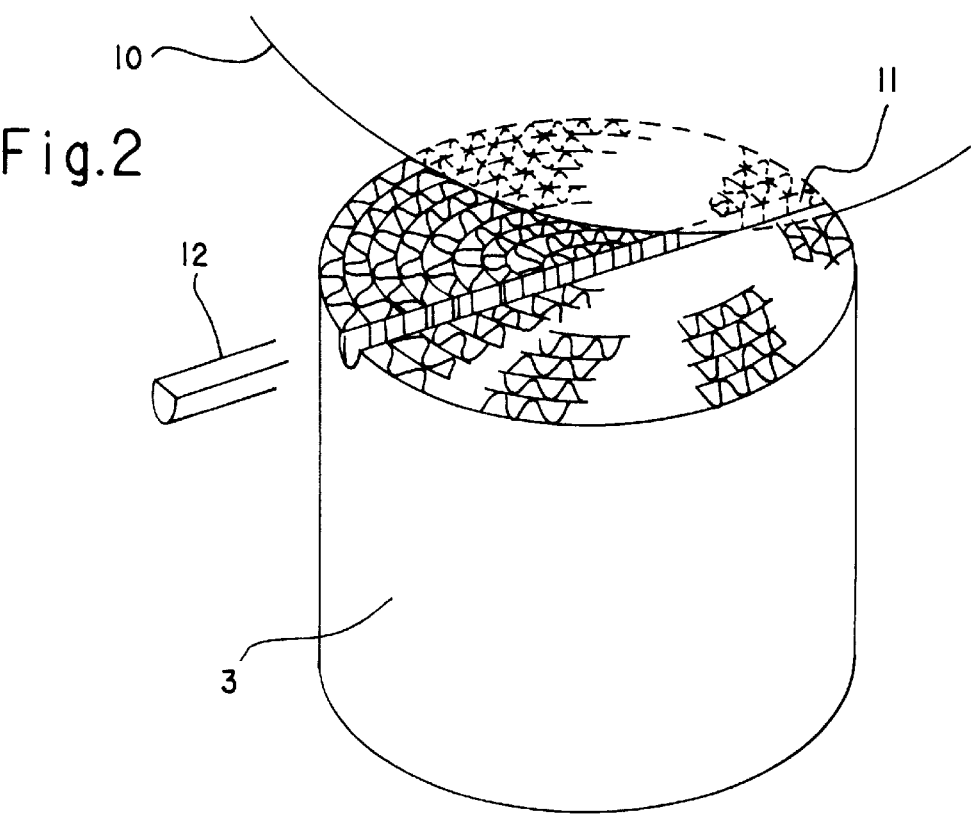
FIG. 2 is a schematic perspective view for explaining another example of the catalyst support in accordance with the invention.

As shown in FIG. 2, in this example, an indent 11 of 2 mm in depth is formed by pushing an iron disc 10 of 2 mm in thickness, 200 mm in diameter and of which periphery is coated with TiC against the core unit 3 starting from an end of the core unit. A bonding material 12 according to SUS304 of 2 mm in thickness and 3 mm in width is then inserted in the indent 11 in such a manner as to be higher than the end edge of the core unit 3 by 1 mm. Melting of the inserted bonding material 12 is started from this higher part by irradiation with $CO_2$ laser, and the molten material is deposited onto the core body 3 in which indent 11 is formed. The deposit conditions are 600 W in power output and 200 mm/min. in speed under argon atmosphere.

In this Example 2, though the bonding material 12 is formed into a barrel-shape of 2×3 mm in section, sectional shape of the bonding material is not limited thereto and any other shape such as rectangular or round shape can be selected. the sectional shape of the indent is also freely selected including barrel-shape, square-shape, V-shape, etc.

It is preferable that the molten bonding material 12 reaches flowing down to the bottom of the indent 11 so that the bonding material may be deposited on the full surface of the indent 11 of the core unit 3 thereby obtaining a very stable bonded assembly. In this sense, this Example 2 is featured by the core unit 3 provided with a groove of certain depth.

[Example 3]

Figure 3A:
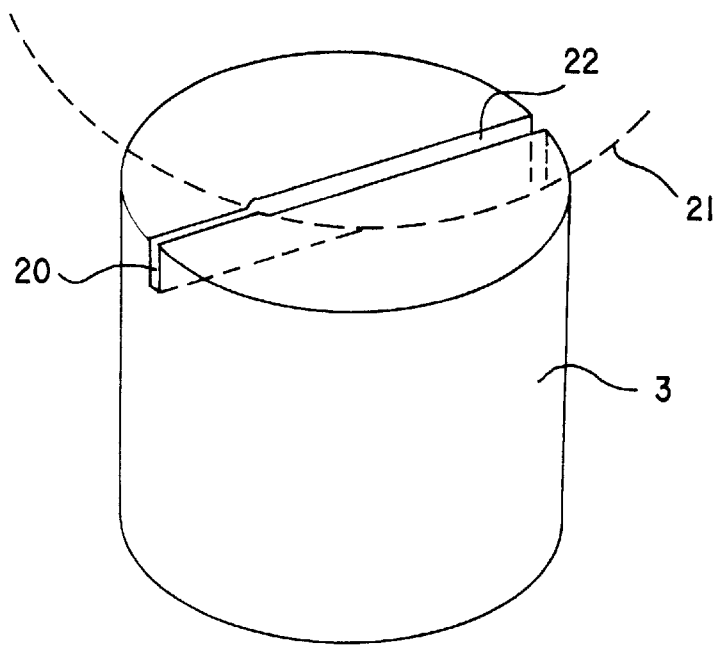
FIGS. 3(a) and (b) are schematic perspective views for explaining an example of catalyst support in which indented part is formed.
Figure 3B:
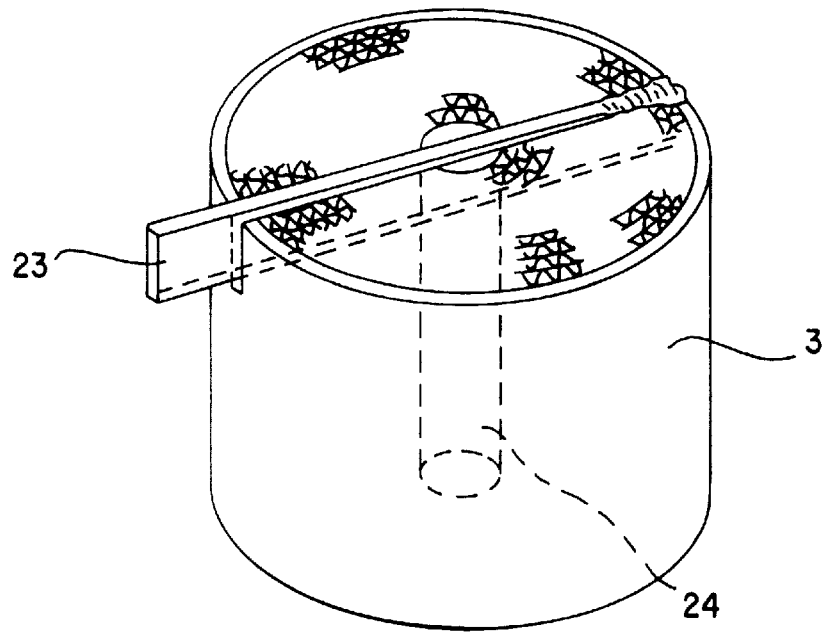
Figure 4:
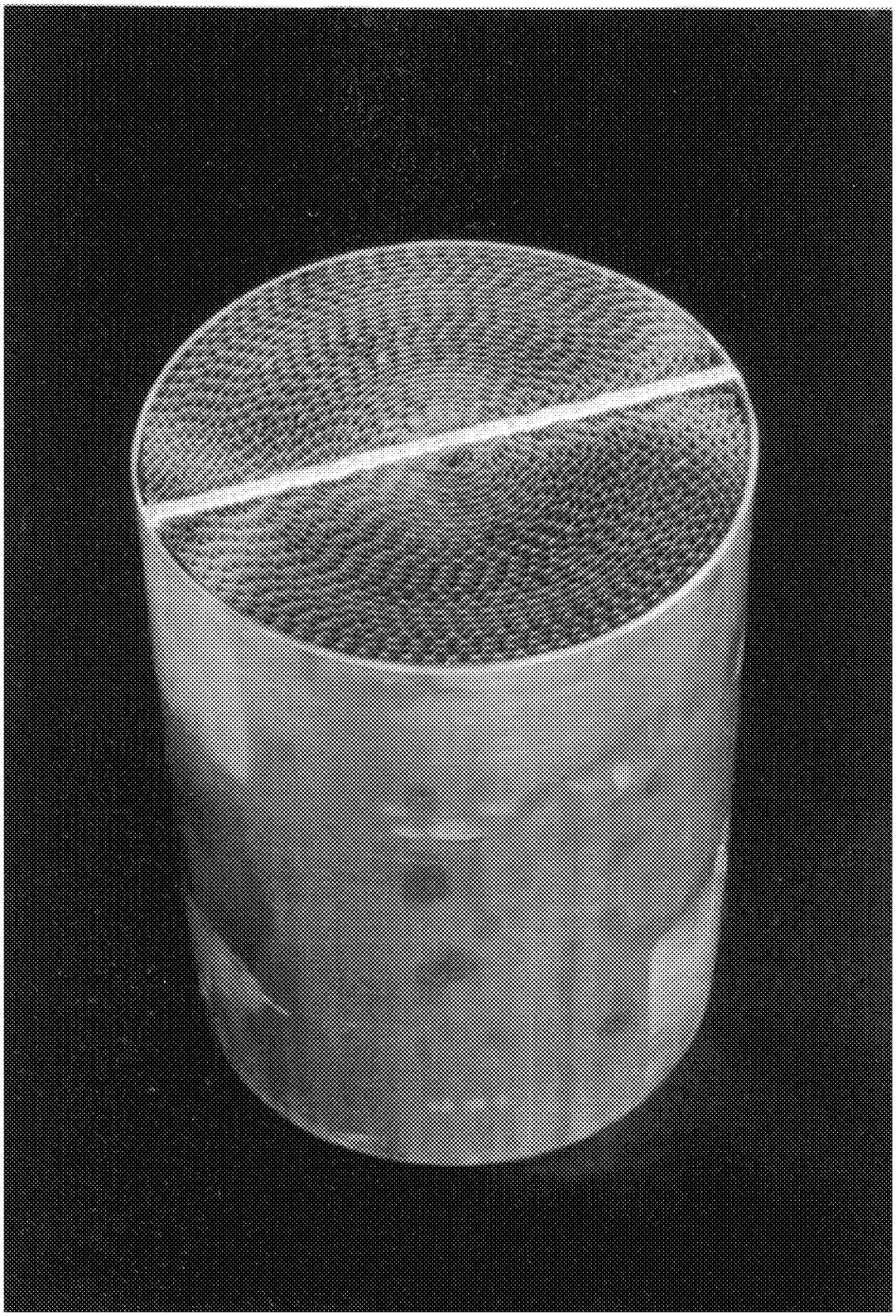
FIG. 4 is a simulation of an enlarged photograph of the catalyst of Example 3 taken from above.

As shown in FIG. 3(*a*), in the core unit a of this example, an opening or slit-like indent 20 of 16 mm in depth is formed by cutting in the axial direction of the core unit with a diamond grindstone 21 of 0.5 mm in thickness and 200 mm in which is rotated at 2000 rpm. The formed indent 20 is expanded or widened into opening 22 with an iron disc of 1.2 mm in thickness coated with TiC, and a bonding material 23 according to SUS304 of 2 mm in thickness and 14 mm in width is inserted in the indent 22 in such a manner as to be higher than the end of the opening of the core unit by 0.7 mm. The melting step of the inserted bonding material 23 is started from this higher part by irradiation with $CO_2$ laser to deposit the molten bonding material on the core unit 3 provided with the opening 22. The deposit conditions are 600 W in output and 150 mm/min. in speed. FIG. 4 shows a simulation of an enlarged photograph of the metallic catalyst support of Example 3 taken from above.

Two ends of the bonding material 23 may be bonded to a case or outer casing and also with a core member 24 as is shown in FIG. 3(*b*). In this regard, the bonding material may be either of a substance of the same category as the outer casing or the core unit or of any other different base material.

Though FIG. 3(*b*) shows a bonding material longer than the core unit which protrudes from only one side thereof, it is also preferable that the bonding material protrudes from both sides of the core unit. In effect, utilizing the protruding part of the bonding material, it will be easy to position the melting part of the bonding material or move the entire core unit. It is further possible to bond the such-protruding part of the bonding material to the outer casing.

Though $CO_2$ laser is employed as the welding means in the foregoing Example 1, 2 and 3, it is also preferable to use electron beam, arc and other means.

As for the materials of the outer casing or case, materials according to JIS4305-SUS304, -SUS310, SUS430, and other appropriate materials are also applicable in place of the mentioned 20Cr-5Al.

[Example 4]

In this example, a core unit is provided with a slit-like indent of 1 mm in width and 12 mm in depth by means of a cutting grindstone of 11 mm in thickness. Then, a plate-like bonding material prepared according to SUS304 of 3 mm in thickness and 9 mm in width and which is larger than the indent is inserted in the indent by press fitting in such a manner as to be higher than the end face opening of the core unit by 0.7 mm while widening the slit-like indent. Utilizing the press fitting, precision of engagement between the indent and bonding material is very easily achieved.

It is preferable that the mentioned plate-like bonding material employed in the foregoing Examples 3 and 4 has a shape suitable for easy melting by the thermal energy of a $CO_2$ laser and smooth flow-out of molten material in a large amount to be deposited onto the indent. For that purpose, it is preferable that the bonding material is nail-shaped, i.e., T-shaped or Y-shaped, or the like.

[Example 5]

In this example, a bonding material according to SUS304 of 1.2 mm in thickness and 10 mm in width is inserted in an indent widened by means of a disc of 2 mm in thickness in the similar manner to Example 3. In this step, it is preferable that a thin film ribbon of about 25 micron and composed of an amorphous brazing agent is attached to two sides of the bonding material. Then the bonding material is heated to 1130° C. under a vacuum or a nitrogen atmosphere, whereby the molten brazing agent (i.e., amorphous thin film) is deposited in the space between the soldering material and the indent to achieve the brazing.

This brazing step is preferably carried out in a vacuum furnace, and it is also preferable to apply a high frequency induction heating to the bonding material under a nitrogen atmosphere.

Advantages of this example are as follows:
(1) The brazing agent is very flexible and easy to handle because it is in a form of a metallic foil.
(2) No gas is produced at all during the heating.
(3) Obtained structure is uniform.
(4) Melting is achieved in a short time.

Though the amorphous brazing agent is employed in this example, it is also preferable to use other brazing agents such as known powder pastes.

[Example 6]

In this example, after widening the indent of the core unit by means of an iron disc coated with TiC, a bonding material according to SUS304 of 2 mm in thickness and 10 mm in width is inserted in the indent.

In this step, it is preferable that an electroless coating film of Ni-P alloy directly precipitated on the surface of the bonding material is used as brazing agent. As a result of brazing tests, it was acknowledged that preferable percentage of such precipitation is Ni-97% and P-3%, and the film thickness is in the range of 10 to 30 micron.

Then the bonding material is heated to 1200° C. under vacuum to melt the brazing agent (Ni-P alloy thick film), whereby the molten brazing agent is deposited between the bonding material and the indent to achieve the brazing. This brazing step is preferably carried out in a vacuum furnace, and it is also preferable to apply a high frequency induction heating to the bonding material under a nitrogen atmosphere.

Advantages of this example are as follows:
(1) Since the brazing agent is directly plated on the surface of the bonding material, insertion working is very easy and a highly precise brazing of the bonding material all over the surface can be achieved.
(2) Control of the brazing agent (with plated film) is easy.
(3) Composition of the brazing agent can be freely selected by controlling the conditions of plating solution.
(4) Brazing agents containing Cu, Pb, B, etc. other than the combination of Ni-P are also applicable, and a brazing agent suitable for individual use can be selected among a variety of those agents at reasonable cost.

[Example 7]

Figure 5A:
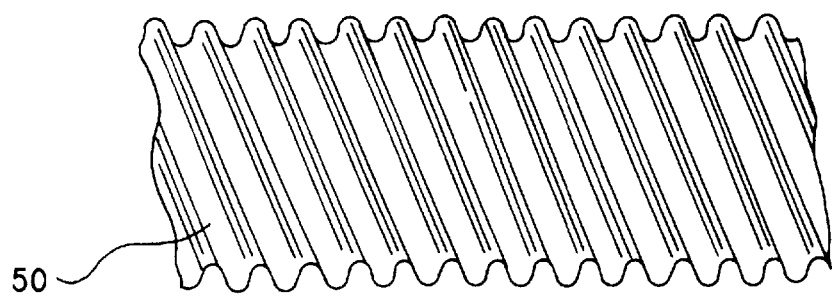
FIGS. 5(a), (b) and (c) are schematic views for explaining examples of the corrugated plate and an example of the corrugated plates in a combined state.
Figure 5B:
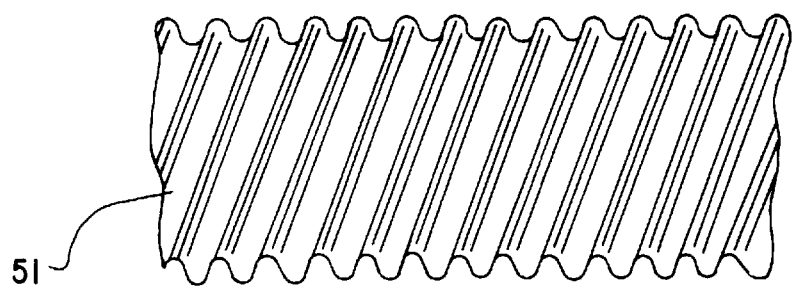
Figure 5C:
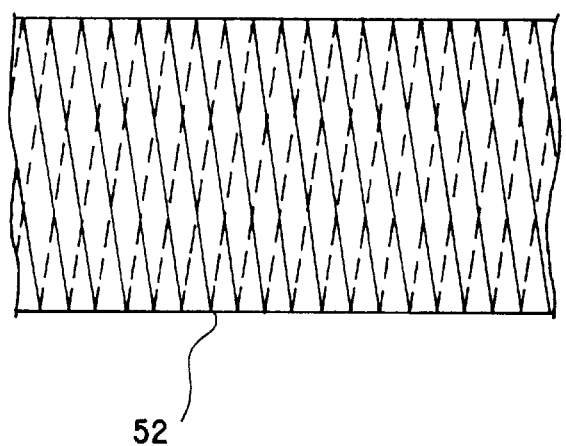

In this example, as shown in FIG. 5, a 20Cr-5Al foil of 0.05 mm in thickness is formed into a corrugated plate of which the inclination is 4°. Then a corrugated plate 50 is combined with another corrugated plate 51 in such a manner that back side of the plate 50 is in contact with front side of the plate 51 with their respective corrugations crossing one another to present a combined state 52 as shown in FIG. 5(*c*). Then the combined plates are rolled together to form a multi-layer cylindrical core unit of 80 mm in diameter. A slit-like indent of 14 mm in depth is formed by means of a diamond grindstone of 0.5 mm in thickness and 20 mm in diameter starting from the end portion of the core unit. The formed indent is widened with an iron disc of 1.2 mm in thickness and coated with TiC, and then a bonding material according to SUS304 of 2 mm in thickness and 13 mm in width is inserted in the indent in such a manner as to be higher than the end edge of the opening of the core unit by 1 mm. Melting of the inserted bonding material is started from this higher part by irradiation with a $CO_2$ laser to deposit the molten bonding material on the core unit provided with the indent.

Figure 6:
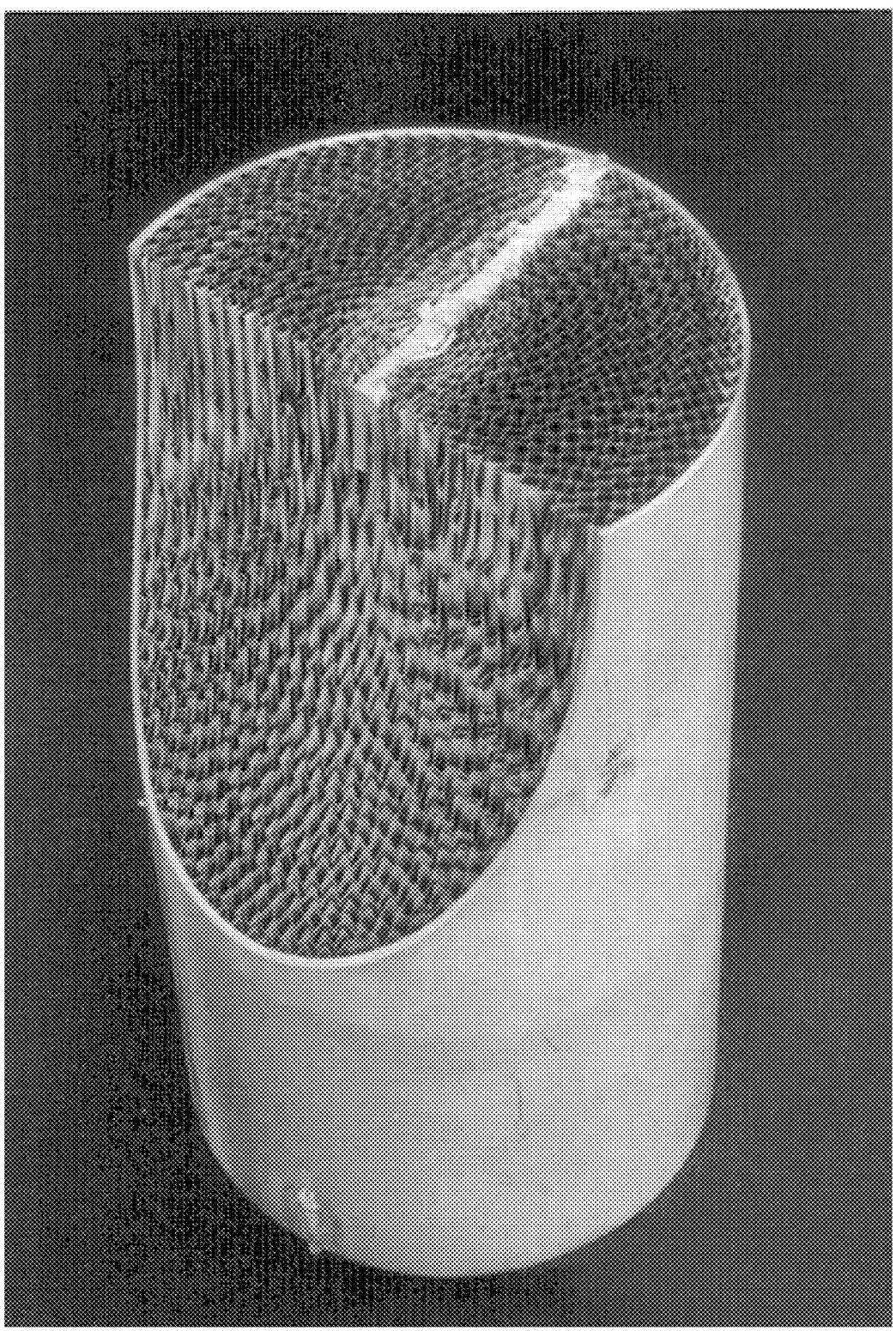
FIG. 6 is a simulation of a photograph in which core unit of the invention is partially cut away.

The deposit conditions are 600 W in output and 150 mm/min. in speed. FIG. 6 shows a simulation of an enlarged photograph of the core unit of Example 7 partially cut away with a wire cutter and taken from above.

This cross type honeycomb construction can be obtained not only by this example but also by any other example of the invention.

Advantage of this example is as follows:

In the cross type metallic catalyst support formed by combining corrugated plates of the above mentioned inclination, utilization of any joining method including brazing and spot-welding has been heretofore very difficult because every joining face thereof may be very small like a spot. Now this invention has made it possible to put such type of catalyst support into practical use for the first time.

[Example 8]

Figure 7:
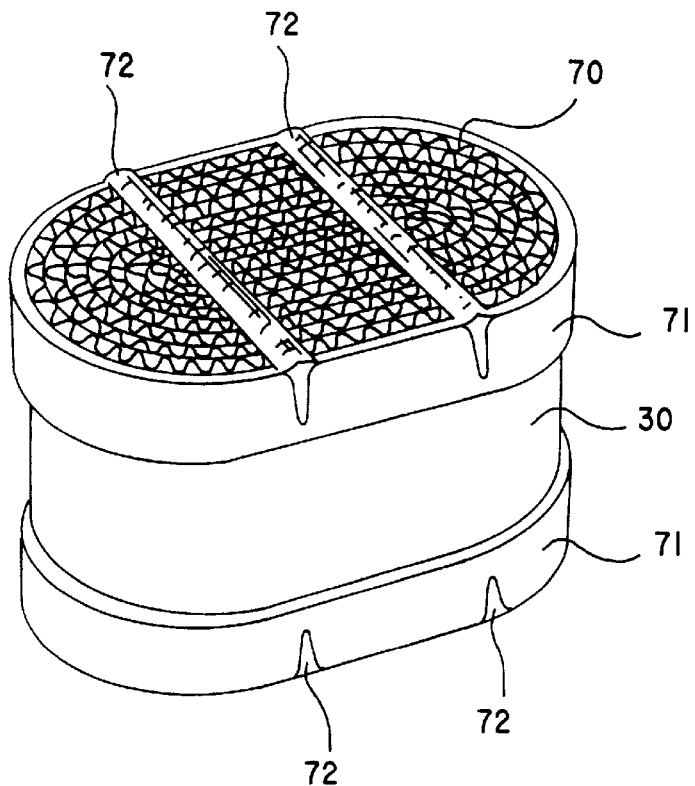
FIG. 7 is a schematic perspective view for explaining another example of catalyst support in which indented part is formed in the core unit like a racing track.

As shown in FIG. 7, in this example, a racing-track-shaped core unit is provided with at least one flat ring 71. It is preferable to employ a bonding material 72 as the ring 71.

In the conventional racing-track-shaped core unit, it was very difficult to carry out heat treatment (at not lower than 875° C.) while maintaining such a shape. To overcome this drawback, an improved heat treatment was proposed in Japanese Laid-Open Patent Publication (unexamined) No. 139045/1991, and in which two end portions of a core unit of honeycomb construction formed by rolling were preliminarily flattened, and flat tough rings were securely mounted on the two end portions to maintain the initial flatness as it is throughout the heat treatment in a furnace.

As compared with such a disclosed improvement, this example according to the invention achieves a further improvement. That is, no flat tough ring is required in the embodiment, but a flat core unit comprising a corrugated plate and a flat plate may be heat treated as it is, and even if employing some flat ring and outer casing, required dimensions of these additional members, e.g., thickness may be less than half of the mentioned known flat tough ring, thus required amount of use being largely reduced. Accordingly, the volume of core unit in its entirety is also largely reduced.

[Example 9]

Figure 8:
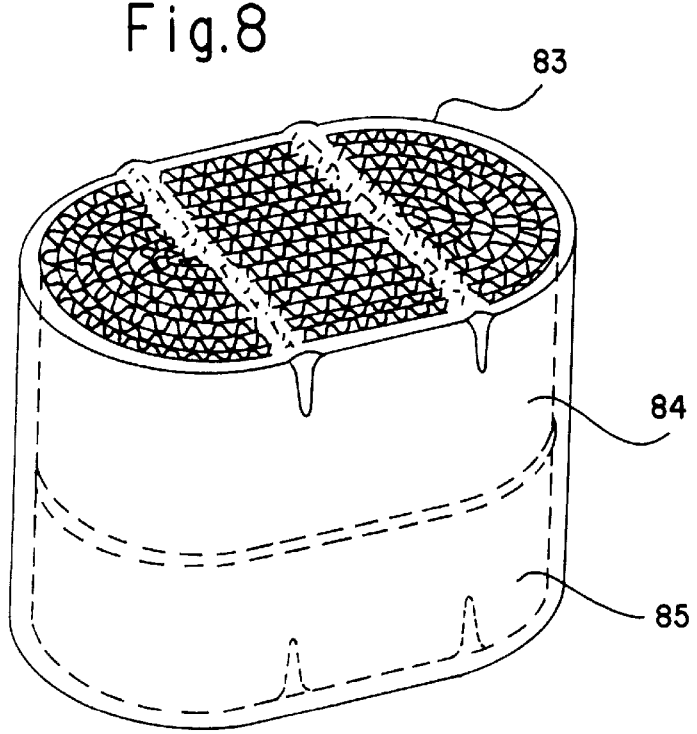
FIG. 8 is a schematic perspective view for explaining a core unit divided into two sections having different cell structures respectively.

As shown in FIG. 8, in this example, a core unit in the outer casing 83 is divided into two parts, i.e., a core section 84 and a core section 85. Accordingly, the core sections 84 and 85 may be respectively formed into constructions different from each other. For example, the core section 84 may comprise an ordinary corrugated plate and flat plate combined by rolling, while the core section 85 may be formed in free combination of a corrugated plate of different mesh, that of inclined corrugation, a flat plate provided with meshes, that provided with punched holes, and corrugated plates only, or any other conventionally known construction.

[Example 10]

In this example, no bonding material is employed but bonding is achieved directly by the indent itself.

Figure 9:
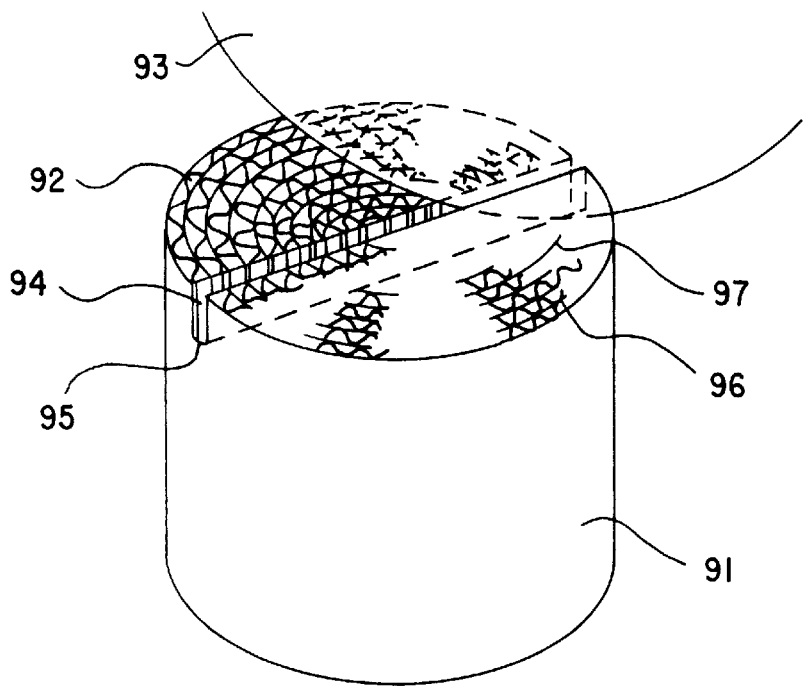
FIG. 9 is a schematic perspective view for explaining a further example of the catalyst support in which indented part is formed.

As shown in FIG. 9, in the core unit 91 containing plates 92 of this example, an opening is formed into a slit-like indent 94 of 10 mm in depth by cutting in the axial direction of the core unit with a diamond rindstone 93 of 3% in thickness and 30 cm in diameter rotated at 2000 rpm. Then the bottom 95 of he indent 94 is joined over the full length of the indent 94 by some adequate means such as welding or brazing, whereby a corrugated plate 96 and a flat plate 97 forming the indent 94 in the core unit are bonded to each other. In addition, it is preferable to join also the side portion.

[Example 11]

Figure 10:
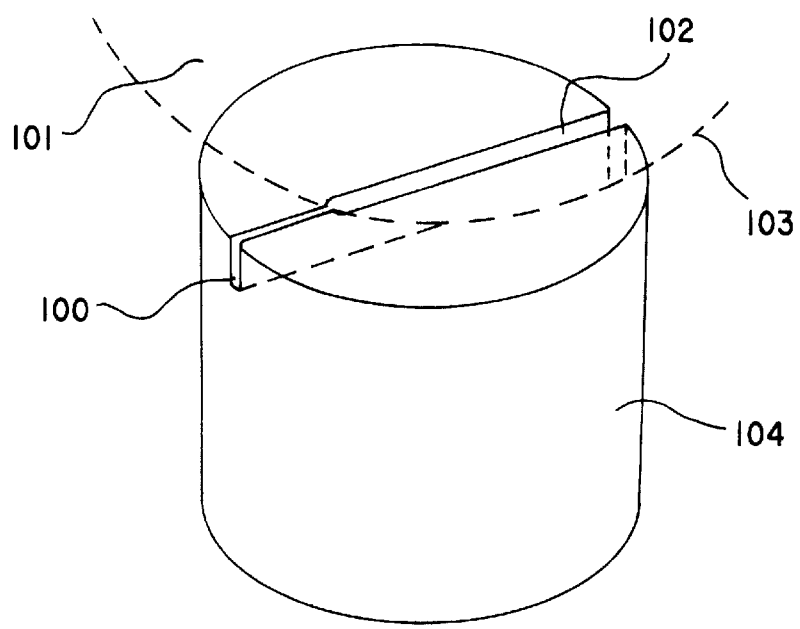
FIG. 10 is a schematic perspective view for explaining a still further example of the catalyst support in which indented part is formed.

As shown in FIG. 10, in this example, a cutting grindstone of 1 mm in thickness similar to that employed in Example 10 is likewise employed, and after cutting into a slit-shape 100 of 8 mm in depth in the same manner as the foregoing Example 10, the formed slit-like cutout portion 100 is widened with a rotatable disc 101 (coated with TiC) of 3 mm in thickness thereby forming an indent 102.

In the indent 102 at this time, parts of the honeycomb member, i.e., corrugated and flat plates located near the peripheral edge of the cutout portion 100 are forcibly directed to fall down sideways along the indent 102 side from its vertically erected state, during the widening step to be 3 mm in width and 10 mm in depth, due to a load applied from above or a frictional heat generated by contact of a rotatable disc 101 rotating at high speed and having a smooth outer periphery 103 for such frictional contact. Then the cutout portion is bonded by welding or brazing in the same manner as the foregoing Example 10 so that the indent 102 is solidly formed on the core unit 104.

The core unit without bonding material as described above forms a U-shaped bonded portion which is tough enough for practical use, and a more tough bonding state will be achieved when some other bonding material is additionally used.

[Example 12]

Figure 11:
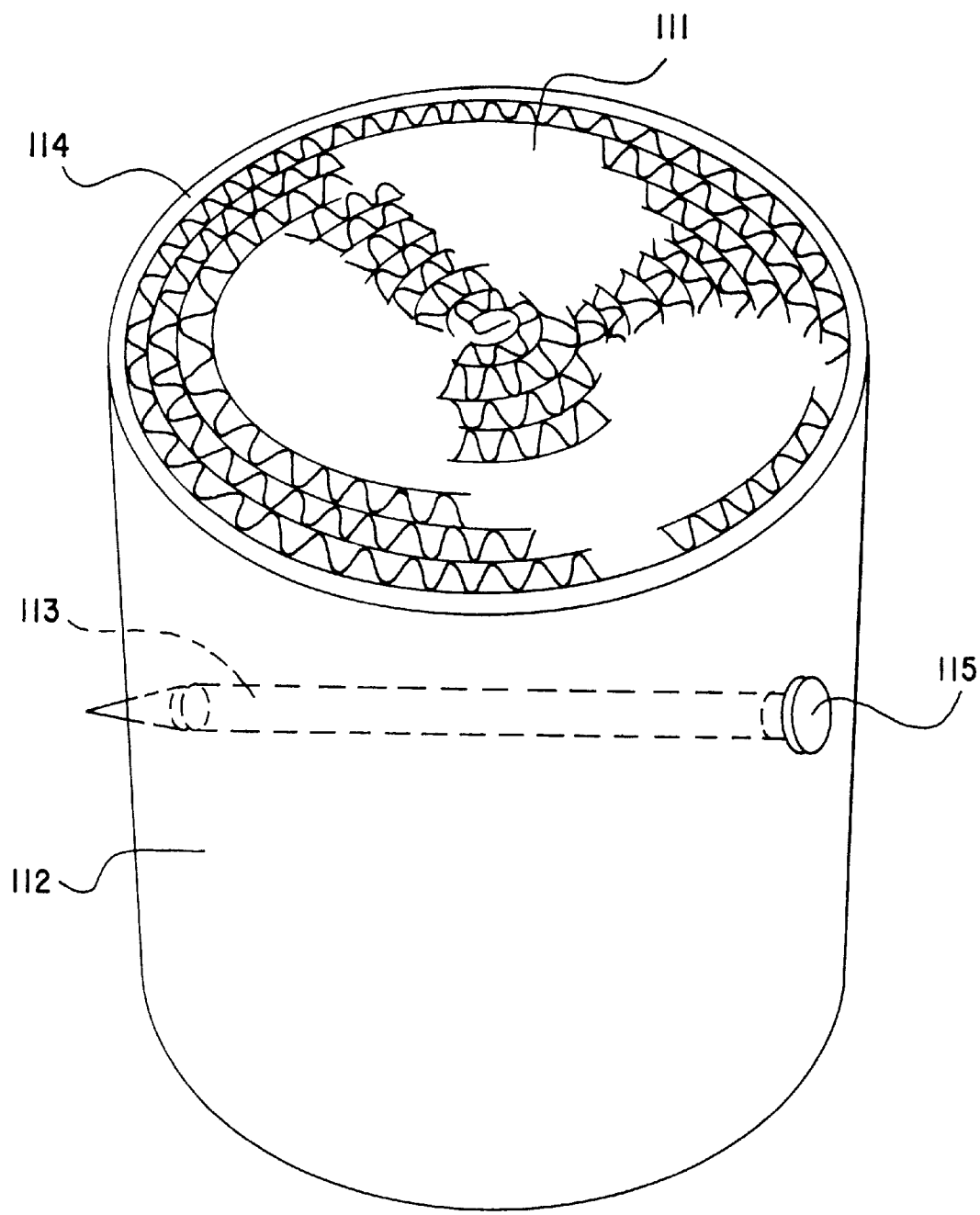
FIG. 11 is a schematic perspective view for explaining a yet further example of the catalyst support in which body of the core unit is joined directly with a bonding material.

In this example, joining takes place not at the end face opening as is done in the foregoing examples but at the body of a core unit 111 as shown in FIG. 11.

A top end of a bonding material 113 plated with Ni as mentioned above is forcibly inserted through the body 112 of the core material 111 at a predetermined portion, as shown in FIG. 11. In this step, portions of the flat plate and corrugated plate being in contact with the bonding material 113 are caused to fall down sideways along the peripheral edge of the bonding material 113 and contact tightly thereto.

It may be said that, in any of the foregoing examples 1 to 11, bonding takes place at the end face opening of the core unit and, therefore, the bonding force rendered by the bonding material may decline in proportion to the distance from the end face, resulting in a disadvantage of occurrence of vibration or friction between the flat and corrugated plates at distant portions due to exhaust gas introduced therein and passing therethrough. To prevent such a situation, it is preferable that the body portion of the core unit 111 is also joined as shown, when required.

Such vibration and/or friction between the flat and corrugated plates may bring about metallic fatigue thereby causing not only breakdown of the core unit but also getting out or separation of catalyst elements stacked onto the core unit, eventually resulting in remarkable shortening of life of the entire device.

The possibility of vibration is higher in the combination of a corrugated plate with another corrugated plate combined in such a manner as to cross each other and formed by rolling together than in the combination between flat plate and corrugated plate, and this disadvantage will possibly arise not only in the conventional construction of metallic catalyst support but also in that of future developed ones.

Then, the core unit 111 is heated to 1200° C. under vacuum and either the bonding material 113 or the Ni plated layer, i.e., brazing agent precipitated on the surface becomes molten to be bonded to the core unit 111.

In the example shown in FIG. 11, the core unit 111 is provided with an outer casing 114, and in such a construction it is preferable to preliminarily provide a hole through the outer casing for easy insertion of the bonding material 113. In the construction without such outer casing 114, the bonding material 113 may be inserted either directly through the body portion 112 of the core unit 111, or through a hole preliminarily formed through the body portion.

Though a pin type bonding material 113 with a head 115 is shown in FIG. 11, the head is not always necessary.

When utilizing such a pin type bonding material 113, this shape of the pin is very effective from the viewpoint of bonding strength of the core unit.

In addition, there is no particular restriction in terms of shape, number, inserted position, etc. of the bonding material coated with brazing agent to be inserted through the body portion.

The core unit of above construction, in which such bonding materials as a pin inserted through the body, thin film, etc. are joined together to form a solid unit, may be utilized singly and, furthermore, the core unit may be also used jointly in cooperation with any method or means of the foregoing examples and/or known brazing, spot welding and any other joining method, whereby each of these methods or means may be entirely reinforced or improved.

In the bonding material employed together with the pin inserted through the body, thin film, etc. to form a solid unit, not only an electroless Ni plated material is useful as a brazing agent but also any amorphous metal is useful as a brazing agent as described with reference to FIGS. 12 and 13.

In Example 1, it is also preferable that the bonding material is plated with a suitable metal as a brazing agent by dip brazing or other method. In this Example 1, a Ni film of electroless Ni-P alloy is directly precipitated on the surface. As for the percentage of such precipitation of Ni-P, it is preferable that the composition is Ni-97% and the P-3%, and film thickness is in the range of 10 to 50 micron, preferably 30 micron. The bonding material is heated to 1200° C. under vacuum to melt the brazing agent (Ni-P alloy film), and the molten brazing agent is deposited between the bonding material and the flat and corrugated plates of the core unit keeping a close contact therebetween. This brazing step is preferably carried out in a vacuum furnace, and it is also preferable to apply a high frequency induction heating to the bonding material under a nitrogen atmosphere. As for the brazing agent, though Ni plate is one is employed in this example, it is also preferable that other brazing agents such as amorphous blazing agents be used. As for the configuration of the bonding material, it is also preferable to employ a thin plate bonding material.

[Example 13]

Figure 12:
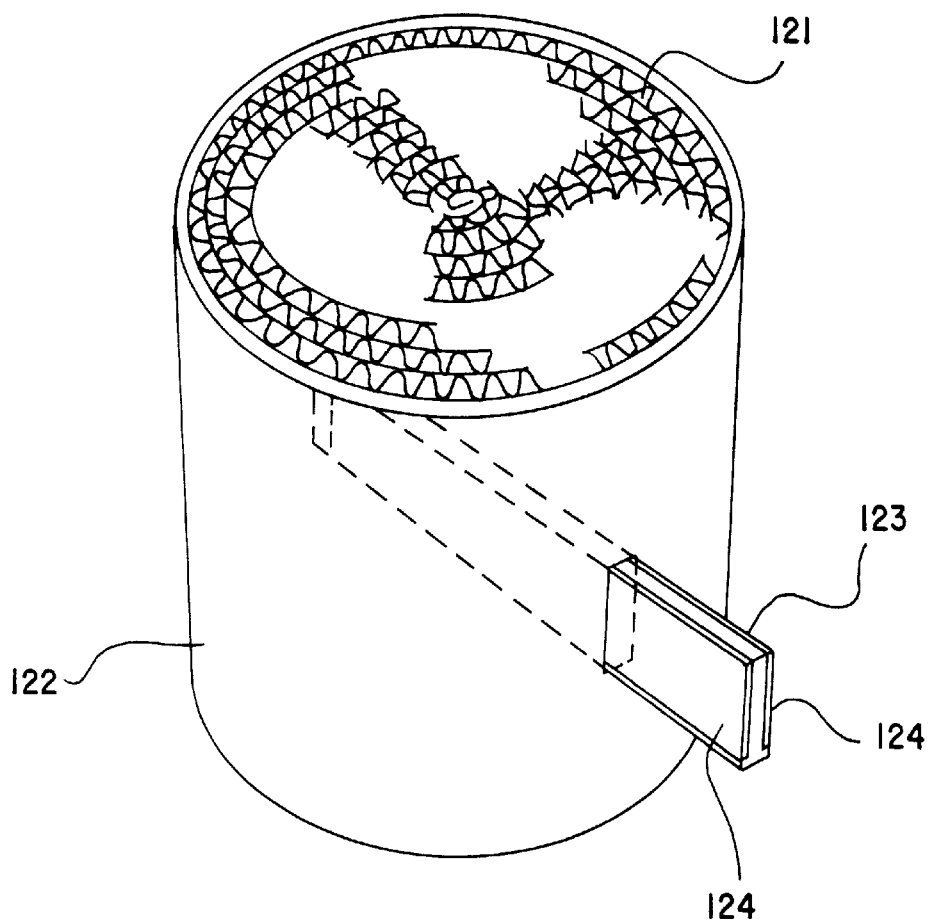
FIG. 12 is a schematic perspective view of a yet further example in which thin film bonding material is bonded to a body portion of core unit.
Figure 13A:
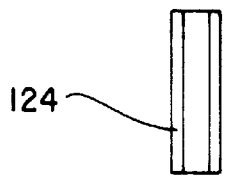
FIG. 13 is a schematic view showing an example of thin plate bonding material used to be inserted through body portion of the core unit.
Figure 13B:
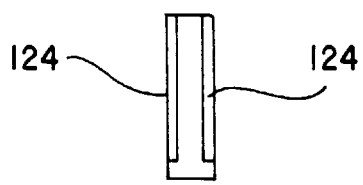

As shown in FIG. 12, in this example, a thin film bonding material 123 is bonded to a body casing 122 of a core unit 121. As shown in FIG. 13, this thin plate bonding material 123 is peculiar in section, and in a recess, formed therein an amorphous tape 124 is placed. It is preferable that end of the tape 124 and other required spots are provisionally fastened by spot welding or the like.

The shape of the thin plate is not limited to this example and, as a matter of course, any other shape of thin plate may be freely designed as far as the bonding material inserted there through is in tight contact with the core unit 121.

Referring back to FIG. 12, the outer casing 122 is preliminarily provided with a hole for easy insertion of the bonding material 123. It is preferable that a predetermined position of the core unit 121 is preliminarily provided with a hole by laser or other means so that the mentioned bonding material 123 may be forcibly inserted through this hole and cause the flat and corrugated plates in contact therewith to fall down sideways along the bonding material 123 and contact tightly thereto. Then, the core unit 121 is heat-treated at 1130° C. under vacuum to melt the amorphous brazing agent placed in the recess of the bonding material 123 to bond the core unit 121, the bonding material 123 and the outer casing 122 together.

Conditions for selecting amorphous brazing agent and for carrying out the heat treatment in this example may be the same as the foregoing Example 5.

In addition, even if the brazing of the pin, thin plate, etc. without solidly fixing them to the core unit is omitted, the advantage or reducing the vibration is still provided owing to the incorporation itself of these members.

It is to be noted that there has been no core unit which is joined with any bonding material such as pin inserted through the body of the core unit.

It is certain that a laser, electron beam or the like assures a working process of high quality with high precision and at high speed, but that a high mounting or fitting precision is also essential on the part of an object to be worked. It is generally said that the tolerance in such precise fitting should be less than 0.1 mm. On the other hand, in the field of art to which the present invention is designated, no such high precision is required, and tolerance thereof may be five times as loose as the mentioned, and a honeycomb construction of sufficient bonding strength may be achieved even when average joined percentage is no more than 70%.

In another aspect of the invention, it is also preferable that a honeycomb construction is formed by utilizing a thick film bonding material in which the thickness of a foil to be used is 10 to 200 times, preferably about 2 mm corresponding to 40 times, as thick as the conventional honeycomb construction, instead of forming a core unit of honeycomb construction by directly or indirectly welding or brazing heat resistant metal foils, each being of 0.05 mm in thickness.

Accordingly, every metallic catalyst support is embraced in the scope of the invention as far as it is formed by the steps of directly melting all or any part of the aforementioned bonding materials by applying such energy as a $CO_2$ laser, an electron beam, arc, argon are etc. thereto, and forming a honeycomb construction utilizing the molten bonding material. Further, every metallic catalyst support is embraced in the scope of the invention as far as it is formed by the steps of melting a brazing agent interposed between a bonding material and a core unit, and bonding said bonding material and honeycomb construction together.

Formation of the indent described above is also one of the essential features for preferably embodying the present invention.

More specifically, the indent is advantageous, not only for increasing the bonding strength by enlarging the bonding area between the indent and the bonding material, but also for effectively preventing the honeycomb construction from getting out in axial direction by inserting the bonding material of strong bonding force in the indent.

Compression tests were carried out on the core units of honeycomb construction obtained in some of the foregoing examples, and following compressive strength were obtained:

In case of Example 1, the test was carried out on the core unit in which bonding material of 2 mm in thickness and 2 mm in width was employed. Compressive strength thereof was 50 (kgf).

In case of Example 3, the test was carried out on the core unit in which bonding material of 2 mm in thickness and 14 mm in width was employed. Compressive strength thereof was 250 (kgf).

Though specific examples in which welding by $CO_2$ laser was performed in the foregoing examples, it is also preferable to employ electron beam means in place of a $CO_2$ laser on conditions of 500 W in output and 200 mm/min. in speed under a helium atmosphere.

This electron beam method has an advantage of being almost free from the problem of plasma which is produced and inhibits smooth welding in case of $CO_2$ laser. Further, though 20Cr-5Al is employed as a material of core unit and a material according to SUS304 is employed as a bonding material in the foregoing examples, the invention is not limited thereto.

As for the bonding material, it is preferable to select a material of sufficient weldability for the honeycomb construction. For instance, known 20Cr-10Ni, (i.e., 308 type), 23Cr-13Ni (i.e., 309 type) are recommendable because they contain an appropriate amount of ferrite in austenite structure and exhibit superior weldability.

It is preferable that predetermined parts or spots on the end face opening of the core unit, i.e., portions for joining the bonding material such as portion on which bonding material is placed in case of Example 1, peripheral edge of the indent in case of Examples 2 and 3, are pre-heated to near 400° C. by high frequency induction heating or the like. By such preheating, the flat plate and corrugated plate forming the core unit tend to have a wettability, i.e., weldability with the molten bonding material, and thus preheating results in exact joining between the bonding material molten with a $CO_2$ laser and the predetermined portions of the core unit.

As for the mentioned honeycomb constructions used in the invention, any of such construction already known in the art may be available. Thus, the invention includes every conventionally known heat resistant metal forming the honeycomb construction, foil of such metal, configuration of corrugated plates and flat plates thereof, thickness, pitch, number of required plates, etc. A honeycomb construction containing a core member can be also used in the invention.

The invention further includes the mentioned specific honeycomb constructions such as the construction formed by crossing one corrugated plate and another corrugated plate and rolling them together, as well as the one formed by utilizing expanded metal as a flat plate.

Dimensions of the indent formed according to the invention are not particularly defined, but normally they are more or less 1/100 to 1/2, preferably 1/20 to 1/4 of full length of the core unit or 3 to 20 cm in length, and 1 to 13 mm, preferably 1 to 5 mm in width. As for the means for forming the indent, any means can be used in principle as far as a predetermined size of indent can be satisfiably formed, and representative means are those for cutting, welding, and widening, for instance.

As for the cutting means, a disc-shaped cutter or disc rotatable at high speed is preferably employed and, more specifically, grindstone cutter, wire cutter or the like are available, for instance. As for the melting means, the mentioned laser, etc. is available. As for the widening means, iron or ceramic discs, etc. are available, and water cooling may be useful when required. All of the mentioned means can be operated under normal operating conditions.

In the invention, it is necessary to join at least one part of the indent formed as described above. By such joining, the configuration of the honeycomb construction is maintained and strength thereof is achieved. Such joining is may be applied to at least one part of the indent. In effect, the percentage of joining area is not defined as long as configuration of the honeycomb construction is maintained with sufficient strength. Preferably, about 20% of the indent area is to be joined, and joining full surface of the indent is also permitted as a matter of course.

The joining method is not particularly defined, either. Accordingly, a variety of joining means capable of joining the indent can be employed including the mentioned means using a brazing agent, plasma, TIG welding, etc. In addition, among the mentioned cutting means, the melting method employed for not producing vapor from base material usually has both of the mentioned means so as to be capable of bonding the cutout portion after cutting.

In the invention, it is sometimes necessary to forcibly cause the cutout surface to fall down sideways for the purpose of achieving a so-called lap joint. Such forcible falling down sideways of cutout portion for a lap joint may extend all over the cutout portion or partially, and normally 50 to 300%, preferably about 200%. Another purpose of the mentioned forcible falling down sideways of the cutout portion exists in that the indent or peripheral edge of the opening is joined together while being in close contact with the bonding material at all times by resiliency as a result of such forcible falling down sideways. As for the means for forcible falling down sideways, ultrasonic vibration or direct press-fitting of bonding material is available other than the mentioned means.

In one aspect of the invention, a bonding material is used as described above. In this manner, the bonding material serves as a so-called insert metal for melting together with base material and forming one solid unit, and moreover performs a function as a structural member. Other than the mentioned bonding materials, at least one of filler wire or powder-like material may be be applied to all of the indent or any part thereof. Normally, at least 10% of the indent should be applied or filled therewith. In this regard, in case of 10 applying the filler wire or powder to all of the indent or in case that there is no indent, an overlayer is rebuilt thereon, which is one of the preferable features of the invention. Methods for filling the filler wire or powder are not particularly defined, but any suitable method can be employed herein.

In the invention, a honeycomb construction having a core member is also preferably used as mentioned above. As for the core member itself, any of the known core members may be satisfactorily used. More specifically, a core for winding corrugated and flat plates is preferably used, and the shape of the core may be freely chosen among rod-shape, pipe-shape, plate-shape, etc.

As has been described so far, in the present invention, a core unit of honeycomb construction comprising a corrugated plate and a flat plate each of heat resistant metal is formed by rolling or laminating these plates together thereby forming a multi-layer; bonding the rolled or laminated corrugated and flat plates by melting a bonding material itself or a brazing agent coated on the bonding material; and applying the molten material to the end face opening of the core unit. This bonding process is quite novel and never has been proposed before.

When employing this novel bonding method, the use of expensive solder or a vacuum furnace is no longer necessary, and precise and troublesome spot welding is not required, either, and thus a simple and exact bonding is achieved. Furthermore, the mentioned serious problem of getting out of the plate located at the center part of the core unit is now overcome.

Owing to the tough joining achieved according to the invention, resistance to high temperature is improved as compared with the prior arts and, as a result, the invention is preferably applied to a manifold catalytic converter installed close to the engine.

The invention is easily applicable to any honeycomb construction in which exact and secure bonding has been considered difficult by any of the known spot welding, laser welding brazing, etc., including a construction formed by crossing and rolling a corrugated plate and another corrugated plate, a construction formed by alternately rolling a flat plate and a corrugated plate using an expanded metal, and any other difficult honeycomb construction, eventually resulting in considerable reduction in cost of metallic catalyst support.

The invention provides means for a solution to the serious problems, to which a number of attempts have been heretofore proposed but have not satisfied, concerning the art of how to achieve exact and secure bonding between the honeycomb core unit and outer casing.

Though the foregoing description has mainly treated the core unit of honeycomb construction comprising a corrugated plate and a flat plate each of 20Cr-5Al heat resistant metal of 0.05 mm in thickness, the properties, number, configuration, and portions to be applied of the bonding material, core member, outer casing and other are not restricted to those specified in the foregoing examples.

Though an indent is provided in the core unit, a portion convex from the end face opening may be also preferable instead of the indent as far as the end face opening of the core unit is joined at appropriate depth in the axial direction. In this sense, it may be said that the indent is not always necessary. In case of forming such indent, it is also preferable that slit-like cutouts are preliminarily provided at required portions of the corrugated and flat plates, respectively, then the plated are rolled or laminated to form a multi-layer, thereby forming a predetermined continuous indent.

In the invention, the indent of the core unit may be disposed downstream rather that upstream of exhaust gas. In case of disposing the indent upstream only, numerical aperture thereof may be reduced, but the reduction ratio remains so small as to be about 7% in the case wherein an indent of 5 mm in width is provided at the end face opening of 80 mm in diameter. Such a small reduction percentage should be considered rather advantageous in view of improvement of catalyst performance than disadvantageous with reference to the disclosure in Japanese Laid-Open Utility Model Registration Publication (unexamined) No. 35919/1990.

It is a matter of course that the invention is applicable not only to internal combustion engines such as a gasoline engine, diesel engine but also to combustion burners and catalyst supports for combustion or chemical reaction.

It is to be understood that the foregoing relates to only preferred embodiments of the invention, and that various changes and modifications may be made in the invention without departing from the spirit and scope thereof.

A still further advantage of the invention is to provide a metallic catalyst support obtained by rolling flat and corrugated plates of which surfaces have been already treated, thus a metallic catalyst support in a more completed form being obtained.

The conventional process comprises the steps of rolling flat and/or corrugated plates, inserting the rolled plates in an outer casing to form a core unit, and brazing the necessary part or parts to make the core unit complete. Then, the completed core unit is heat-treated, surface-treated to completely form a metallic support in which a catalyst is inserted.

It is to be noted that in the conventional process, the steps of heat treatment, surface treatment, etc. are carried out after the brazing step.

When a core unit is dipped in a treatment solution for brazing or sprayed with such solution, the core unit tends to contain the solution like a water-absorbed sponge, and since it is difficult to leave a required amount of the solution while removing the other portion therefrom, it is difficult to achieve a uniform surface treatment.

This difficulty increases in proportion to the increase of viscosity of the treatment solution. Moreover, since this difficult treatment should be applied to one by one resulting in increase in cost. On the other hand, in the present invention, any plate, whether it is a flat plate or corrugated plate, can be first heat-treated and surface-treated in their band state, then they are formed into a core unit by rolling cylindrically, and thereafter an indent is formed on the core unit. Then a bonding material is inserted in the indent and caused to become molten to obtain one solid unit. This process according to the invention is feasible because the surface-treated layer stuck to the plate members are removed by the grindstone or disc during the step of forming the indent by cutting, whereby the base metal, i.e., metallic catalyst support is exposed, and it is now possible to deposit the molten bonding material on such exposed metal surface of the catalyst support. As a result, a more complete form of metallic catalyst support of uniform surface treated layer can be provided at reasonable cost.

Stainless steel employed as a preferable bonding material is known as being an excellent electrically resistant material. Therefore, by applying an electric current to such a stainless steel bonding material serving as a heat generator, a brazing agent combined with the bonding material is caused to become molten by heat therefrom to braze the indent of the core unit or peripheral edge of opening.

A bonding material according to SUS304 is preferably used. This bonding material is 72 $\mu\Omega$-cm in electric resistance value and $18.9 \times 10^{-6}/°$ C. at $650°$ C. in thermal expansion coefficiency. A further bonding material of 20Cr-5Al is 159 $\mu\Omega$-cm at $900°$ C. in electric resistance value, $15.0 \times 10^{-6}/°$ C. in thermal expansion coefficient, and 1.24% in expansion coefficient.

Since only the bonding material may be heated, there is no need of any large-scaled conventional vacuum furnace consuming a large amount of energy. Only a simple vacuum surface or an atmosphere of nitrogen, etc. is required, whereby a heating of high efficiency is achieved in the invention.

B, Si, etc. have been heretofore employed as brazing agents to obtain a low melting point. A serious problem, however, exists in that for brazing a base material (i.e., core material in this case) in a high temperature range of not lower than $1300°$ C., the B or Si may be diffused and the B or Si penetrates into the joint portion of the core unit to cause a so-called erosion, whereby the joint portion is corroded and becomes brittle, eventually resulting in breakdown of the joint. In the invention, the mentioned brazing temperature is not required to be $1130°$ C. but heating of the bonding material to $1050°$ C. is quite sufficient for necessary diffusion of B or Si, and there is almost no possibility of erosion. Thus a tough joint unit of long life is obtained because the bonding material itself is heated and thermally expanded making it possible to perform joining while being in close contact with peripheral edge of the indent or opening.

In the present invention, a flat plate or a corrugated plate can be oxidized and then heated in the presence of $Al_2O_3$ to produce an $Al_2O_8$ whisker on surface of the plate.

A catalyst can be supported more strongly on the plate thus obtained.

What is claimed is:

1. A metallic catalyst support comprising a core unit of honeycomb construction formed by combining a corrugated plate with a flat plate, or a corrugated plate with another corrugated plate, said plates being made of a heat resistant metal, and by rolling or laminating the plates to form a multi-layer core unit having an end face opening, wherein a portion of the end face opening of said core unit having an indent formed in axial direction across said end face opening and said plates are joined together by a bonding material in said indent, at least a part of said indent having been caused to fall down sideways by inserting a bonding material into the indent and said bonding member having been melted to form molten material and the molten material having been solidified so as to join together the plates in contact with the material of the bonding member.

2. A metallic catalyst support comprising a core unit of honeycomb construction formed by combining a corrugated plate with a flat plate, or a corrugated plate with another corrugated plate, said plates being of a heat resistant metal, and by rolling or laminating the plates to form a multi-layer core unit having an end face opening, a portion of an end face opening of said core unit having a formed indent in axial direction across said end face opening for joining the plates together, at least a portion of said indent having been caused to fall down sideways by rotatable means and at least a portion of said indent is caused to fall down sideways by inserting a bonding material, said bonding member thereafter having been melted to form molten material and the molten material having been solidified so as to join together the plates in contact with the material of the bonding member.

3. A metallic catalyst support comprising a core unit of honeycomb construction formed by combining a corrugated plate with a flat plate, or a corrugated plate with another corrugated plate, each plate being made of a heat resistant metal, and by rolling or laminating the combination to form a multi-layer core unit; a bonding material inserted into a body of said core unit, melted to form molten material and the molten material solidified so as to join the plates in contact with the material of the bonding member and thereby join the core unit together in an axial direction.

4. A metallic catalyst support according to claim 1 or 2, wherein at least a portion of said bonding material is made molten by laser, electron beam, argon arc, or means for high frequency induction heating.

5. A metallic catalyst support according to claim 3, wherein at least a portion of said core unit is joined with the bonding material.

6. A metallic catalyst support according to claim 1, 2 or 3, wherein a molten brazing agent is on said bonding material, and at least one portion of the end face opening of the core unit is joined to said brazing agent.

7. A metallic catalyst support according to claim 2, wherein a molten brazing agent is inserted into said indent, and at least one portion of the end face opening of the core unit is joined to said brazing agent.

8. A metallic catalyst support according to claim 3, wherein a molten brazing material is on said bonding material and at least a portion of said plates are joined with said bonding material by molten brazing agent.

9. A method for manufacturing a metallic catalyst support having a core unit of honeycomb construction of heat resistant metal, the core unit combining corrugated plate with a flat plate, or a corrugated plate with another corrugated plate, the method comprising the steps of forming an indent in the form of a slit in an axial direction of diametrical line of an end face opening of said core unit by a disc, inserting a bonding material into said indent so as to cause portions of the plates to fall down sideways in at least a portion of said indent, melting at least a portion of said bonding material by laser, electron beam, argon arc, or means for high frequency induction heating to form molten material, and solidifying the molten material so as to join together at least a portion of said bonding material with said plates.

10. A method for manufacturing a metallic catalyst support having a core unit of honeycomb construction formed by combining a corrugated plate with a flat plate, or a corrugated plate with another corrugated plate, made of a heat resistant metal, and by rolling or laminating the combination to form a multi-layer core unit; the method comprising the steps of inserting a bonding material into a body of said core unit so as to extend through a portion of said core unit, melting the bonding member to form molten material, and solidifying the molten material so as to join the core unit together in an axial direction.

11. A method for manufacturing a metallic catalyst support according to claim 9 or 10, wherein a brazing agent is inserted into said indent and said brazing agent is melted.

12. A method for manufacturing a metallic catalyst support according to claim 11, wherein said method further includes applying an electric current to a bonding material of electrically resistant material to generate heat and thereby melt a brazing agent combined with the bonding material.

13. A method for manufacturing a metallic catalyst support according to claim 10, wherein said bonding material in an elongated shape is employed.

14. A method for manufacturing a metallic catalyst support having a core unit of honeycomb construction formed by combining a corrugated plate with another plate, both plates being made of a heat resistant metal, and by rolling or laminating the plates so to form a multi-layer core unit; the method comprising the steps of inserting an elongated bonding member into said core unit so as to extend through at least a portion of said core unit and to deform at least some of the plates and thereby create an elastic strain in the plates and urge the plates into contact with the bonding member; and melting the bonding member to form molten material; and solidifying the molten material so as to join together the plates in contact with the material of the bonding member in an axial direction.

15. A method for manufacturing a metallic catalyst support according to claim 14, wherein the bonding member includes a brazing agent.

* * * * *